United States Patent
Nors

(10) Patent No.: US 9,237,388 B2
(45) Date of Patent: Jan. 12, 2016

(54) ONT CONNECTED TO A HOST DEVICE

(75) Inventor: Niclas Nors, Mjölby (SE)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 68 days.

(21) Appl. No.: 14/357,170

(22) PCT Filed: Jan. 23, 2012

(86) PCT No.: PCT/SE2012/050053
§ 371 (c)(1),
(2), (4) Date: May 8, 2014

(87) PCT Pub. No.: WO2013/070136
PCT Pub. Date: May 16, 2013

(65) Prior Publication Data
US 2014/0321855 A1    Oct. 30, 2014

Related U.S. Application Data

(60) Provisional application No. 61/557,012, filed on Nov. 8, 2011.

(51) Int. Cl.
*H04Q 11/04*    (2006.01)
*H04Q 11/00*    (2006.01)
*H04L 12/24*    (2006.01)

(52) U.S. Cl.
CPC ........ *H04Q 11/0485* (2013.01); *H04L 41/0803* (2013.01); *H04Q 11/0062* (2013.01); *H04Q 11/0067* (2013.01); *H04L 41/0206* (2013.01); *H04L 41/0213* (2013.01); *H04Q 2011/0079* (2013.01); *H04Q 2011/0086* (2013.01); *H04Q 2011/0088* (2013.01)

(58) Field of Classification Search
CPC .......... H04Q 11/0485; H04Q 11/0062; H04Q 11/0067; H04Q 2011/0086; H04Q 2011/0088; H04Q 2011/0079; H04L 41/0803; H04L 41/0206; H04L 41/0213
USPC .......................................................... 398/66
See application file for complete search history.

(56) References Cited

U.S. PATENT DOCUMENTS

| 6,601,120 | B1 | 7/2003 | Schimmel | |
| 2004/0136719 | A1* | 7/2004 | Hidai | H04B 10/40 398/135 |
| 2005/0289143 | A1* | 12/2005 | Oshri | G06F 17/30171 1/1 |
| 2007/0153823 | A1* | 7/2007 | Wojtowicz | H04B 10/40 370/463 |
| 2008/0037986 | A1 | 2/2008 | Effenberger | |

(Continued)

OTHER PUBLICATIONS

SFF Committee, "Diagnostic Monitoring Interface for Optical Transceivers" SFF-8472, Rev. 11.3, 2013, 41 pages.

(Continued)

*Primary Examiner* — Dalzid Singh
(74) *Attorney, Agent, or Firm* — Patents On Demand, P.A.; Brian K. Buchheit; Scott M. Garrett

(57) ABSTRACT

Communication between an ONT (1) and a host device (2), which are connected to form a combined ONT-host unit, the communication being associated with an OMCI-configuration of the ONT-host unit. The communication uses a memory of the ONT, and the memory is accessible also to the host device, and comprises e.g. a lock registry. The ONT (1) could e.g. be mounted in an SFP, which is plugged into a suitable contact (3) in the host device (2).

34 Claims, 11 Drawing Sheets

(56) References Cited

U.S. PATENT DOCUMENTS

| | | |
|---|---|---|
| 2009/0304384 A1 | 12/2009 | Li |
| 2009/0317082 A1* | 12/2009 | Kimura ............... H04J 3/1694 398/67 |
| 2010/0104285 A1 | 4/2010 | Shaffer et al. |
| 2011/0262129 A1* | 10/2011 | Shaffer ............... H04B 10/272 398/5 |
| 2011/0268443 A1* | 11/2011 | Adler ............... H04Q 11/0067 398/58 |

OTHER PUBLICATIONS

Extended Extended European Search Report issued in corresponding Application No. EP 12847072.1 dated Jul. 30, 2015, 8 pages.

* cited by examiner

ONT CONNECTED TO A HOST DEVICE

CROSS REFERENCE TO RELATED APPLICATION(S)

This application is a 35 U.S.C. §371 National Phase Entry Application from 371 of PCT/SE2012/050053, filed Jan. 23, 2012, designating the United States, and also claims the benefit of U.S. Provisional Application No. 61/557,012, filed Nov. 8, 2011. The disclosures of both applications are incorporated herein in their entirety by reference.

TECHNICAL FIELD

The disclosure relates to methods for an ONT (Optical Network Termination) of transferring a message to a host device for the ONT, and of receiving a message from a host device for the ONT, the message being associated with an OMCI (ONT Management and Control Interface)-configuration of a combined unit comprising the ONT connected to the host device. The disclosure also relates to methods for a host device for an ONT of transferring a message to the ONT, and of receiving a message from the ONT, the message being associated with an OMCI-configuration of a combined unit comprising the ONT connected to the host device. The disclosure also relates to an ONT (Optical Network Termination) arranged to be connected to a host device, and to a host device arranged to be connected to an ONT.

BACKGROUND

A broadband access may be implemented by a fiber optical access network, e.g. by a B-PON (Broadband Passive Optical Network or a G-PON (Gigabit-capable Passive Optical Network), and such a passive optical network (PON) does not use any electrically powered components to split the signal. A PON comprises an OLT (Optical Line Terminal) located at the service provider (operator), and the OLT provides an interface for the delivery of the services, e.g. telephony, Ethernet data or video over the PON. The PON typically also comprises one or more ONUs (Optical Network Units) or ONTs (Optical Network Terminations), which are connected to the OLT over an ODN (Optical Distribution Network), the ODN including optical fibers. Each ONT/ONU terminates the PON and converts the optical signals into electrical signals for delivery of the services to the end-user terminals, via a suitable user interface.

An ONU (Optical Network Unit), as mentioned above, is defined as a device that terminates any one of the distributed (leaf) endpoints of an ODN, implements a PON protocol, and adapts PON PDU (Protocol Data Units) to a subscriber service interface. An ONT (Optical Network Termination) is defined as a single subscriber device that terminates any one of the distributed (leaf) endpoints of an ODN, implements a PON protocol, and adapts PON PDUs to a subscriber service interface. An ONT may be further provided e.g. with an Integrated Residential Gateway.

Hereinafter, the generic term ONT refers to an ONU or an ONT.

The ONT Management and Control Interface (OMCI) protocol is a standardized PON-management protocol that defines the properties of different Managed Entities, MEs, i.e. units or parts of a passive optical network, and a Managed Entity comprises a number of configuration parameters. The configuration of the ONT is performed via the OLT, using the OMCI protocol, and the configuration parameters are stored in an OMCI MIB (OMCI Management Information Base).

The CWMP (CPE WAN Management Protocol), i.e. the Customer-Premises Equipment Wireless Access Network Management Protocol, is another standardized PON management protocol that is defined by the Broadband Forum, and the CWMP may e.g. be used for managing the functions of a residential gateway.

Conventionally, an ONT is managed by the above-mentioned OMCI, and all functions of the ONT are managed only by this management protocol. However, a more advanced ONT is able to integrate e.g. a residential gateway functionality, wherein the typical PON-related functions are managed through the OMCI, and the residential gateway functions are managed e.g. by the above-mentioned CWMP. Thus, multiple management protocols and data models, i.e. multiple management domains, can be used for managing an integrated ONT, wherein the ONT may be provided e.g. with an integrated residential gateway functionality.

Today, an ONT can be manufactured with a size that is small enough to fit into e.g. an SFP (Small Form-factor Pluggable), and an SFP provided with an ONT may be plugged into any kind of host device that requires PON access, e.g. into a radio base station, a home gateway or an Ethernet switch.

However, in case an ONT is connected to a host device that is managed by a different management protocol than the OMCI, the management protocol of the host device has to be able to interact with the OMCI of the ONT. The host device could be managed e.g. by the SNMP (Simple Network Management Protocol), by the above-mentioned CWMP or by Telnet, and the host device could be managed by any management server used by the customer.

Thus, the host device has to know the basic access-related configuration and capabilities of the ONT, e.g. QoS parameters, bandwidth allocations, scheduling and optical information, in order to interact with the ONT. The host device may also have to send OMCI configuration-related information back to the ONT.

SUMMARY

It is an object of exemplary embodiments described hereinafter to address at least some of the issues outlined above, and this object and others are achieved by the methods and the arrangements according to the appended independent claims, and by the embodiments according to the dependent claims.

A first aspect of exemplary embodiments provides a method for an ONT of transferring a message to a host device, wherein the ONT and the host device are connected to form a combined ONT-host unit. The message is associated with an OMCI-configuration of the ONT-host unit. The ONT is provided with a memory that is accessible also to the host device, and the memory comprises a lock registry. The method comprises the ONT determining, by reading the lock registry, if the memory is available, and locking the memory to the host device by writing in the lock registry, when determining that the memory is available. The method also comprises the ONT writing a message in the memory, the message being associated with an OMCI-configuration of the ONT-host unit, and indicating in the lock registry that a message from the ONT is available in the memory.

The ONT may further read in the lock registry that a response to the message is available in the memory, read the response from the host device in the memory, and indicate in the lock registry that the memory is not in operation.

The message may comprise at least one of an action identifier, a message identifier, and a message content.

The ONT may be mounted in a small form-factor pluggable, SFP, provided with an SFP interface, and the ONT may use said SFP interface for transferring the message to the host device.

A second aspect of exemplary embodiments provides a method for an ONT of receiving a message from a host device. The ONT and the host device are connected to form a combined ONT-host unit, and the message is associated with an OMCI-configuration of the ONT-host unit. The ONT is provided with a memory that is accessible also to the host device, and the memory comprises a lock registry. The method comprises the ONT reading in the lock registry that a message from the host device is available in the memory, and reading the message, which is associated with an OMCI-configuration of the ONT-host unit.

The ONT may further perform an internal operation, based on the received message, write a result of the operation in the memory, as a response to the received message, and indicate in the lock registry that a response is available in the memory.

A third aspect of exemplary embodiments provides a method for a host device of transferring a message to an ONT, wherein the ONT and the host device are connected to form a combined ONT-host unit. The message is associated with an OMCI-configuration of the ONT-host unit. A memory of the ONT is accessible also to the host device, and the memory comprises a lock registry. The method comprises the host device determining, by reading the lock registry, if the memory is available, and locking the memory to the ONT by writing in the lock registry, when determining that the memory is available. The method further comprises the host device writing a message in the memory, wherein the message is associated with an OMCI-configuration of the ONT-host unit, and indicating in the lock registry that a message from the host device is available in the memory.

A fourth aspect of exemplary embodiments provides a method for a host device of receiving a message from an ONT, wherein the ONT and the host device are connected to form a combined ONT-host unit, and the message is associated with an OMCI-configuration of the ONT-host unit. A memory of the ONT is accessible also to the host device, and the memory comprises a lock registry. The method comprises the host device reading in the lock registry that a message from the ONT is available in the memory, and reading the message, which is associated with an OMCI-configuration of the ONT-host unit.

The host device may further perform an internal operation, based on the received message. The host device may also write a response in the memory, the response indicating a result of the operation, and indicate in the lock registry that a response is available in the memory.

The host device may also indicate in the lock registry that the memory is not in operation.

A fifth aspect of exemplary embodiments provides an ONT arranged to be connected to a host device to form a combined ONT-host unit. The ONT comprises a memory that is accessible to a host device connected to the ONT, the memory comprising a lock registry. The ONT also comprises a processing circuitry configured to transfer a message to the host unit, wherein the message is associated with an OMCI-configuration of the ONT-host unit, by:
  determining, by reading the lock registry, if the memory is available;
  locking the memory to the host device by writing in the lock registry, when determining that the memory is available;
  writing a message in the memory, the message being associated with an OMCI-configuration of the ONT-host unit, and
  indicating in the lock registry that a message from the ONT is available in the memory.

The processing circuitry of the ONT may be further configured to read in the lock registry that a response to the message is available in the memory, read the response from the host device in the memory, and indicate in the lock registry that the memory is not in operation.

The processing circuitry of the ONT may additionally or alternatively be configured to receive a message from the host device, the message being associated with an OMCI-configuration of the ONT-host unit, by reading in the lock registry that a message from the host device is available to the ONT, and reading the message in the memory, wherein the message is associated with an OMCI configuration of the ONT-host unit.

The processing circuitry of the ONT may be further configured to perform an internal operation based on the received message, write a response in the memory to the received message, the response indicating a result of the operation, and indicate in the lock registry that a response is available in the memory.

The ONT may be mounted in an SFP, which is provided with an SFP interface that is used for communicating with the host device.

The ONT may further comprise an OMCI MIB for storing parameters associated with the OMCI-configuration, and the memory of the ONT may be is associated with a digital diagnostic monitoring-function.

A sixth aspect of exemplary embodiments provides a host device arranged to be connected to an ONT to form a combined ONT-host unit. The host device is configured to access a memory of a connected ONT, the memory comprising a lock registry. The host device comprises a processing circuitry configured to transfer a message to a connected ONT, the message being associated with an OMCI-configuration of the ONT-host unit, by:
  determining, by reading the lock registry, if the memory is available;
  locking the memory to the ONT by writing in the lock registry, when determining that the memory is available;
  writing a message in the memory, the message being associated with an OMCI-configuration of the ONT-host unit, and
  indicating in the lock registry that a message from the host device is available in the memory.

The processing circuitry of the host device may be further configured to read in the lock registry that a response to the message is available in the memory, and to read the response from the ONT in the memory.

The processing circuitry of the host device may additionally, or alternatively, be configured to receive a message from a connected ONT, the message being associated with an OMCI-configuration of the ONT-host unit, by reading in the lock registry that a message from the ONT is available in the memory, and reading the message, wherein the message is associated with an OMCI-configuration of the ONT-host unit.

The processing circuitry of the host device may be further configured to perform an internal operation, based on the received message.

The processing circuitry of the host device may also be configured to write a response to the received message in the memory, the response indicating a result of the operation, and to indicate in the lock registry that a response is available in the memory.

The processing circuitry may also be configured to indicate in the lock registry that the memory is not in operation.

The host device may also be provided with a contact for receiving an ONT that is mounted in a small form-factor pluggable, SFP, provided with an SFP interface, wherein the host device is arranged to use said SFP interface for communicating with the ONT.

A seventh aspect of exemplary embodiments provides a radio base station, such as e.g. an eNodeB, that is configured to act as a host device according to a sixth aspect.

It is an advantage with exemplary embodiments described herein to allow a host device to access the OMCI configuration of a combined ONT and host device, e.g. an ONT mounted in an SFP that is plugged into the host device, and enable the host device to e.g. view the OMCI configuration parameters and to perform software upgrading and installation procedures.

Further, exemplary embodiments could be implemented only by software, and could use a memory and an interface that is already available, e.g. in an SFP.

BRIEF DESCRIPTION OF THE DRAWINGS

Exemplary embodiments will now be described in more detail, and with reference to the accompanying drawings, in which.

DETAILED DESCRIPTION

In the following description, different exemplary embodiments of the invention will be described in more detail, with reference to accompanying drawings. For the purpose of explanation and not limitation, specific details are set forth, such as particular scenarios and techniques in order to provide a thorough understanding.

Moreover, it is apparent that the exemplary methods and devices described below may be implemented using software functioning in conjunction with a programmed microprocessor or general purpose computer, and/or using an application specific integrated circuit (ASIC). Further, while the embodiments are primarily described in the form of methods and devices, the embodiments may also be implemented as a computer program product or in a system comprising a computer processor and a memory coupled to the processor, wherein the memory is encoded with one or more programs that may perform the functions disclosed herein.

Exemplary embodiments use a memory that is shared by an ONT and a host device for communicating between an ONT and a host device connected to the ONT, the communication being associated with the OMCI configuration of a combined unit formed by the host device and the ONT. Such a combined unit will hereinafter be referred to as an ONT-host unit.

According to an exemplary embodiment, the ONT is mounted in an SFP (Small Form-factor Pluggable) that is plugged into a host device in order to form an ONT-host unit. In this embodiment, the communication between the ONT and the host device could use e.g. a standardized $I^2C$ (Inter-Integrated Circuit) interface that is available in the SFP, and a vendor-specific part of a standardized memory that is also available in the SFP. Thereby, the ONT and the host device are able to exchange information related to the OMCI configuration of the ONT-host unit.

Figure 1:
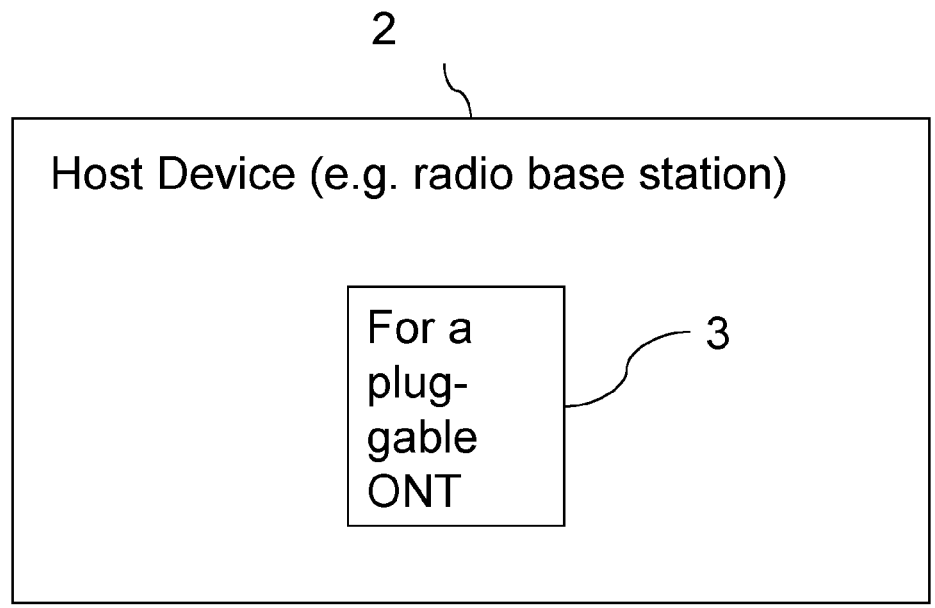
FIG. 1 schematically illustrates an exemplary host device and a pluggable ONT.
Figure 1:
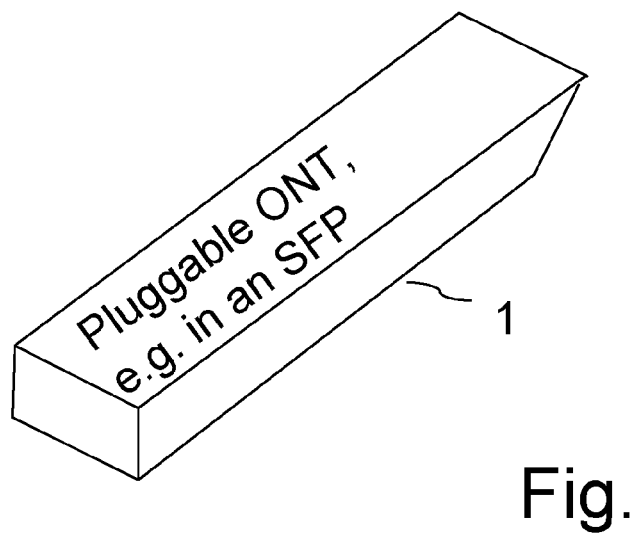

FIG. 1 schematically illustrates a pluggable ONT 1, e.g. an ONT mounted in an SFP, and a host device 2 provided with a contact 3 for receiving the SFP. When the ONT 1 is connected to the host device 2, i.e. the ONT is plugged into a contact 3 in the host device 2, a combined ONT-host unit is formed (not illustrated in FIG. 1). However, a combined ONT-host unit may alternatively be formed by any other suitable connection between an ONT and a host device.

An optical SFP-transceiver, such as e.g. an SFP provided with an ONT, may support a standardized DDM (Digital Diagnostics Monitoring)-function, which is also denoted DOM (Digital Optical Monitoring). The DOM allows an end-user to monitor real-time parameters of the SFP, such as e.g. optical output power, optical input power, temperature, laser bias current and transceiver supply voltage. However, the DOM does not allow the end-user to monitor data related to the configuration of the ONT. In an SFP supporting the DDM, a controller for the DDM is typically available as an $I^2C$ device comprising a memory.

Figure 2:
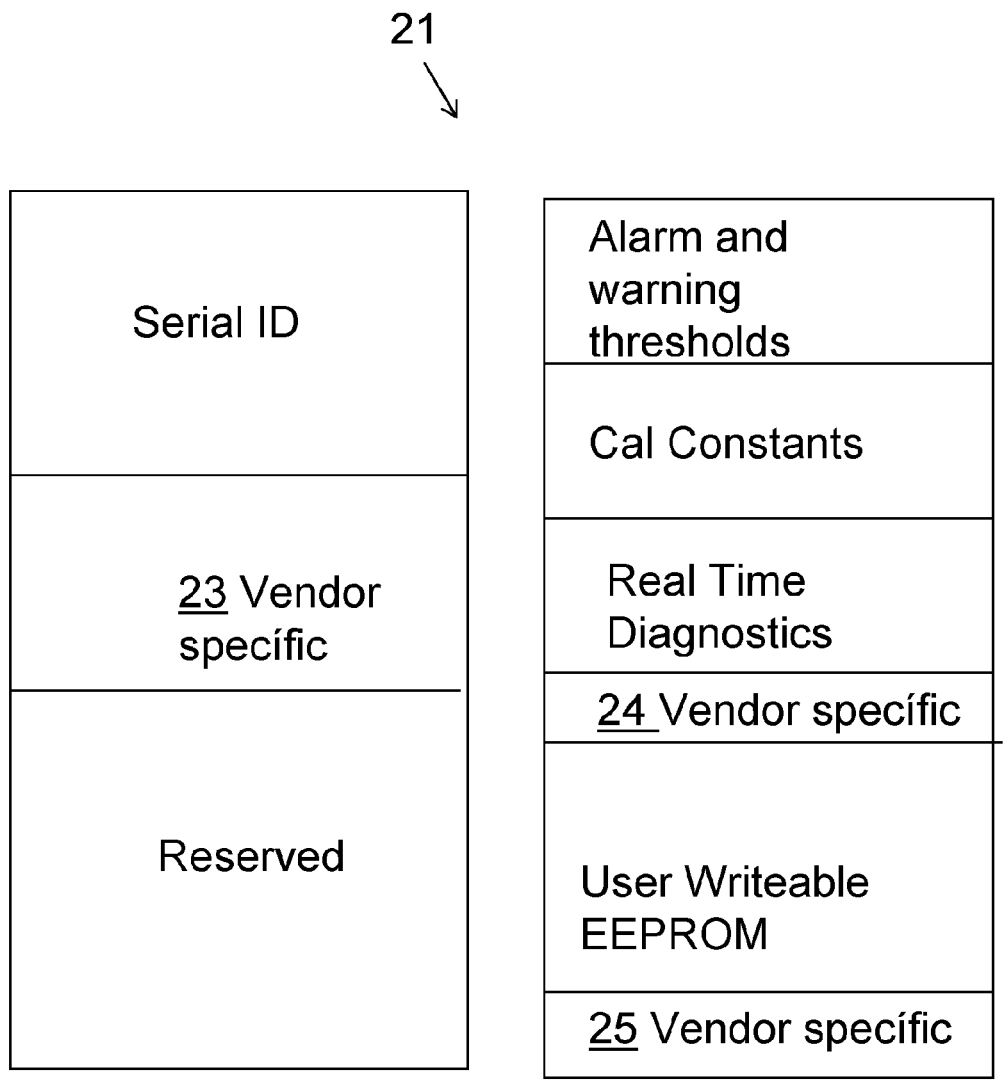
FIG. 2 schematically illustrates a layout of an exemplary memory that may be used as a shared memory.

FIG. 2 illustrates a typical exemplary layout of a memory 21 in such a DDM controller, the memory comprising a Serial ID as defined by the SFP MSA (Small Form-factor Pluggable Multi-Source Agreement), alarm and warning thresholds, real-time diagnostic interface, a user-writable EEPROM, as well as a reserved areas, e.g. for Cal constants. The memory illustrated in the figure also comprises three areas that are available for vendor-specific use, as indicated by reference numerals 23, 24 and 25 in the figure. The illustrated vendor-specific area 23 has a size of e.g. 32 bytes, and the vendor-specific areas 24 and 25 have a size of e.g. 8 bytes each. Thus, the amount of bytes that is available in this memory for vendor-specific use is small, and it is not enough for storing a complete OMCI MIB to be shared with a host device.

However, according to an exemplary embodiment, an available vendor-specific area in a DDM controller of an SFP is used as a shared memory by the ONT and a host device connected to the ONT, for exchanging suitable commands between a host device and the ONT regarding the OMCI configuration of the combined ONT-host unit. The host device could use e.g. a command for reading a specific Managed Entity stored in an OMCI MIB of the ONT for creating a Managed Entity, or for upgrading software.

Figure 3:
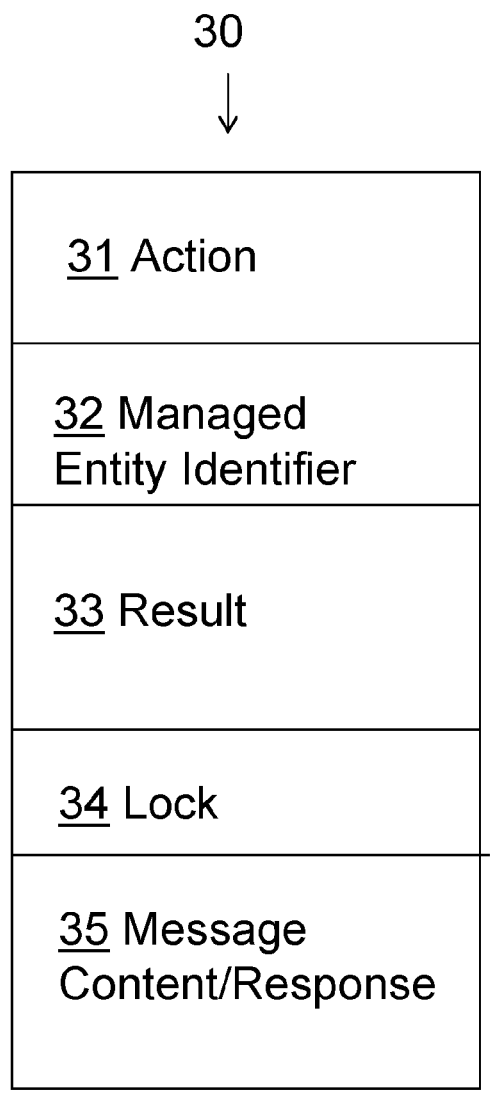
FIG. 3 schematically illustrates an exemplary registry layout of such a shared memory.

FIG. 3 schematically illustrates an exemplary registry-layout of such a shared memory 30, and the shared memory may e.g. be any of the available vendor-specific areas of en existing memory, e.g. in an SFP. However, the shared memory could, alternatively, be any other suitable memory that is accessible by both the ONT and the host device connected to the ONT. The illustrated shared memory 30 comprises an Action registry 31, a Managed Identity, ME, identifier registry 32, a Result registry 33, a Lock registry 34, and a Message Content/Response registry 35.

In the Action registry 31 a value could be stored that indicates an action or operation to be performed. Below is a listing of exemplary values and exemplary actions that may be indicated by a value. (The listing only intends to explain the function of the Action registry, and other actions and other values may be used.)

0x01=Create
0x02=Delete
0x03=Set
0x04=Get
0x05=Get all alarms
0x06=MIB upload
0x07=MIB upload next
0x08=MIB reset
0x0A=Alarm
0x0B=Attribute value change
0x0C=Test
0x0D=Start software download
0x0E=Download section
0x0F=End software download
0x10=Activate software
0x11=Commit software
0x12=Synchronize time
0x13=Reboot
0x14=Get next
0x15=Test result
0x16=Get current data
0x17=Set table
0x18=Set PLOAM Password
0x19=Get PLOAM Password In the ME identifier registry 32, a value could be stored that indicates a managed entity that is the target of an action, i.e. the type of ME and the identity of a ME.

In the Result registry 33, a value could be stored that indicates a result of on action (operation). Below is a listing of exemplary values and exemplary results that may be indicated by the value. (The listing only intends to explain the function of the Result registry, and other results and other values may be used.)

xxxx0000=command processed successfully
xxxx0001=command processing error
xxxx0010=command not supported
xxxx0011=parameter error
xxxx0100=unknown managed entity
xxxx0101=unknown managed entity instance
xxxx0110=device busy
xxxx0111=instance exists In the Lock registry 34 a value could be stored that indicates the current access status of the shared memory. Below is a listing of exemplary values and an exemplary current access status of the memory that may be indicated by the values. (The listing only intends to explain the function of the Lock registry, and other values may be used to indicate the access status of the shared memory.)

xxxxx000=No operation
xxxxx001=Host device action lock
xxxxx010=Host device action ready
xxxxx011=ONT action lock
xxxxx100=ONT action ready
xxxxx101=Response available In the Message Content/Response registry 35 a value could be stored that optionally indicates a content of an action or a response.

Figure 4:
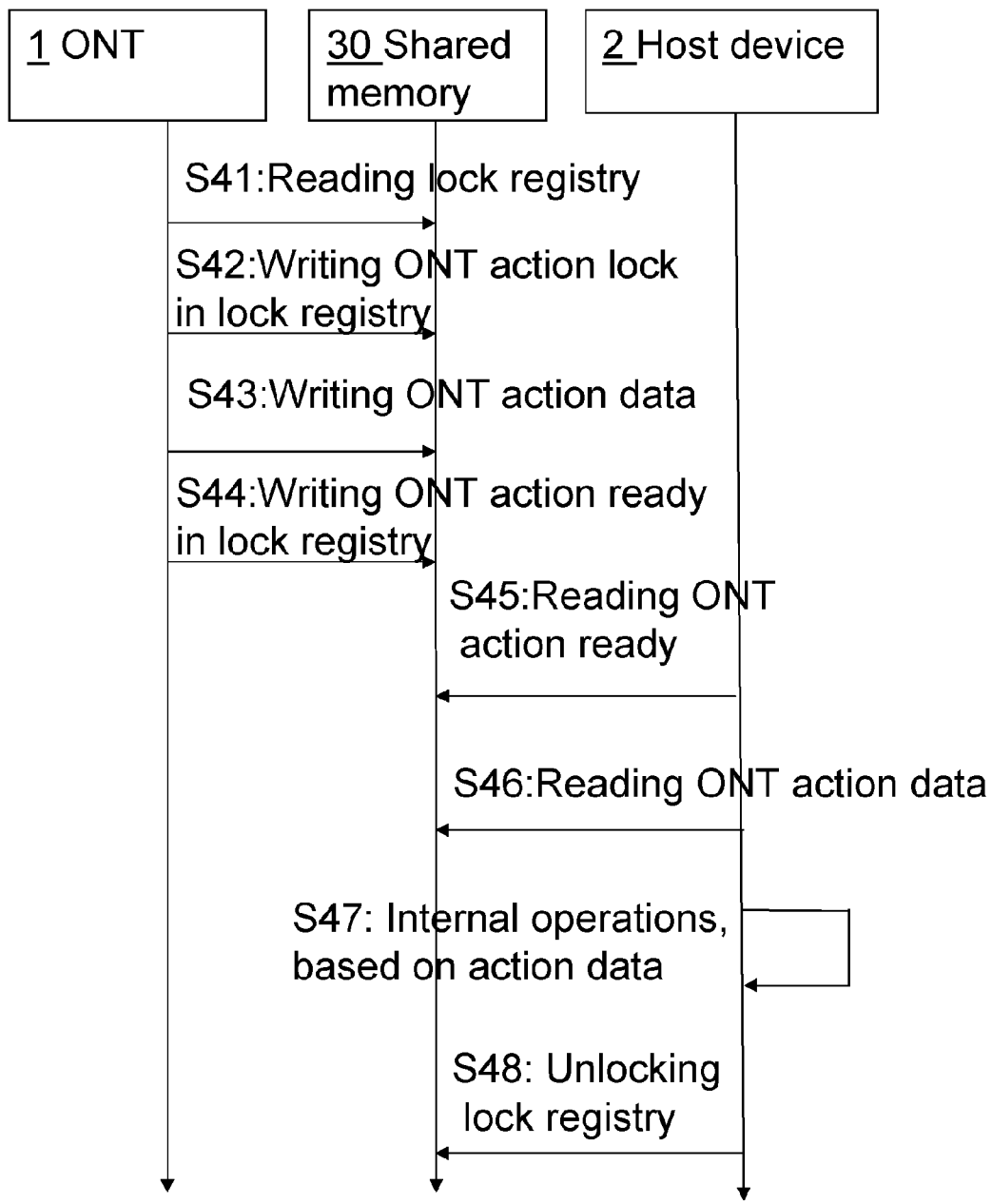
FIG. 4 is an exemplary signalling diagram schematically illustrating an ONT transferring e.g. OMCI configuration parameters to a host device.

FIG. 4 is an exemplary signalling diagram schematically illustrating an ONT 1 transferring e.g. OMCI configuration parameters to a connected host device 2, using a shared memory 30 according to the exemplary layout illustrated in FIG. 3, and the exemplary values described in the listings above.

In signal S41, the ONT reads the lock registry 34 of the shared memory 30 to determine if the ONT may access the memory, i.e. if the shared memory is available to the ONT. If the ONT reads xxxxx000 (No operation) in the lock registry, the memory is available, and the ONT writes xxxxx011 (ONT action lock) in the lock registry, in signal S42, to indicate that a communication from the ONT will start, and to lock the shared memory to the host device. Next, in signal S43, the ONT writes appropriate action data, e.g. 0x0B (Attribute Value Change), in the Action registry 31, for indicating the action that it wants to communicate to the host device. In case of an Attribute Value Change, the action data that is written in the shared memory in signal S43 could also comprise a value written in the Managed Entity Identifier registry 32, the value indicating the ME type and the ME instance ID, and a value written in the Message Content registry 35, the value indicating the new attribute value. Next, in signal S44, the ONT writes xxxxx100 (ONT action ready) in the Lock registry, for indicating to the host device that the message from the ONT is ready to be received and processed by the host device. Since this particular action does not require any direct response from the Host device, the ONT does not have to wait for a response.

In signal S45, the Host device reads in the lock registry that action data from the ONT is available in the memory, and in signal S46 the Host device reads the appropriate registry in the shared memory 30 in order to identify the action, the ME identity, and the Message Content. Next, the host device performs the necessary internal operations, in signal S47, based on the action data received from the ONT in the shared memory.

Since this particular exemplary action does not require any response, the Host device will unlock the shared memory, in signal S48, by writing xxxxx000 (No operation) in the Lock registry. Accordingly, the shared memory 30 will be available for further OMCI configuration-related communication between the ONT and the host device, regarding the combined ONT-host unit.

Figure 5:
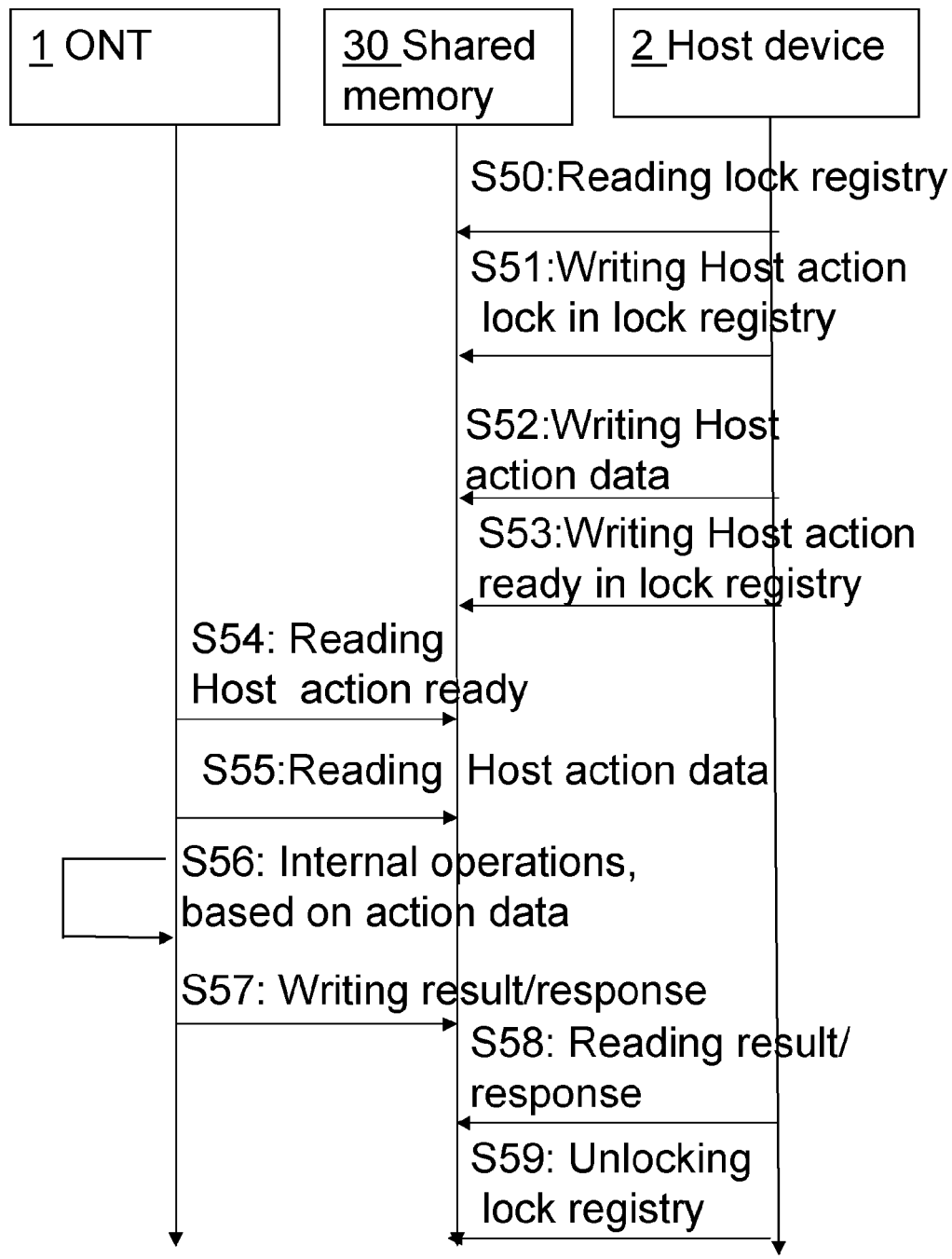
FIG. 5 is an exemplary signalling diagram schematically illustrating a host device transferring e.g. OMCI configuration parameters to an ONT.

FIG. 5 is another exemplary signalling diagram schematically illustrating a host device 2 connected to ONT transferring e.g. OMCI configuration parameters to the ONT 1, using the shared memory 30 according to the exemplary layout illustrated in FIG. 3, and the exemplary values described in the listings above.

In signal S50, the host device 2 reads the lock registry 34 of the shared memory 30 to determine if the host device may access the memory, i.e. if the shared memory is available to the host device. If the host device reads xxxxx000 (No operation) in the lock registry, the memory is available, and the host device writes xxxxx001 (Host device action lock) in the Lock registry, in signal S51, to indicate that a communication from the Host device will start, and to lock the shared memory to the ONT. Next, in signal S52, the Host device writes appropriate action data, e.g. 0x01 (Create), in the Action registry 31, for indicating the action that it needs to communicate to the ONT, e.g. that it wants to create a Managed Entity. If the action is Create, the data written in the shared memory in signal S52 will also comprise a value written in the Managed Entity Identifier registry 32, the value indicating the ME type and the ME instance ID. Next, in signal S53, the host device writes xxxxx010 (Host device action ready) in the Lock registry, for indicating to the ONT that a message from the Host device is ready to be received and processed by the ONT.

Since this action may require a response from the ONT, the Host device will wait for the lock registry to indicate xxxxx101 (Response available), as an indicator that a response to this action is available in the shared memory.

After reading the Host device action ready in the Lock registry, in signal S54, the ONT reads the registers in the shared memory 30, in signal S55, in order to identify the action and the ME identity. Next, the ONT performs the necessary internal operations, in signal S56, based on the action data received from the host device in the shared memory. After the operation, the ONT writes, in signal S57, a result in the Result registry 33, and optionally a response in the Message response registry 35. Then, the ONT will write xxxxx101 (Response available) in the Lock registry (not specifically indicated in the signalling diagram).

After reading the Response available in the Lock registry (not specifically indicated in the signaling diagram), the Host device reads, in signal S58, the Result registry and optionally the Message response registry, depending on the result flags, and unlocks the shared memory by writing xxxxx000 (No operation) in the Lock registry, in signal S59.

Figure 6A:
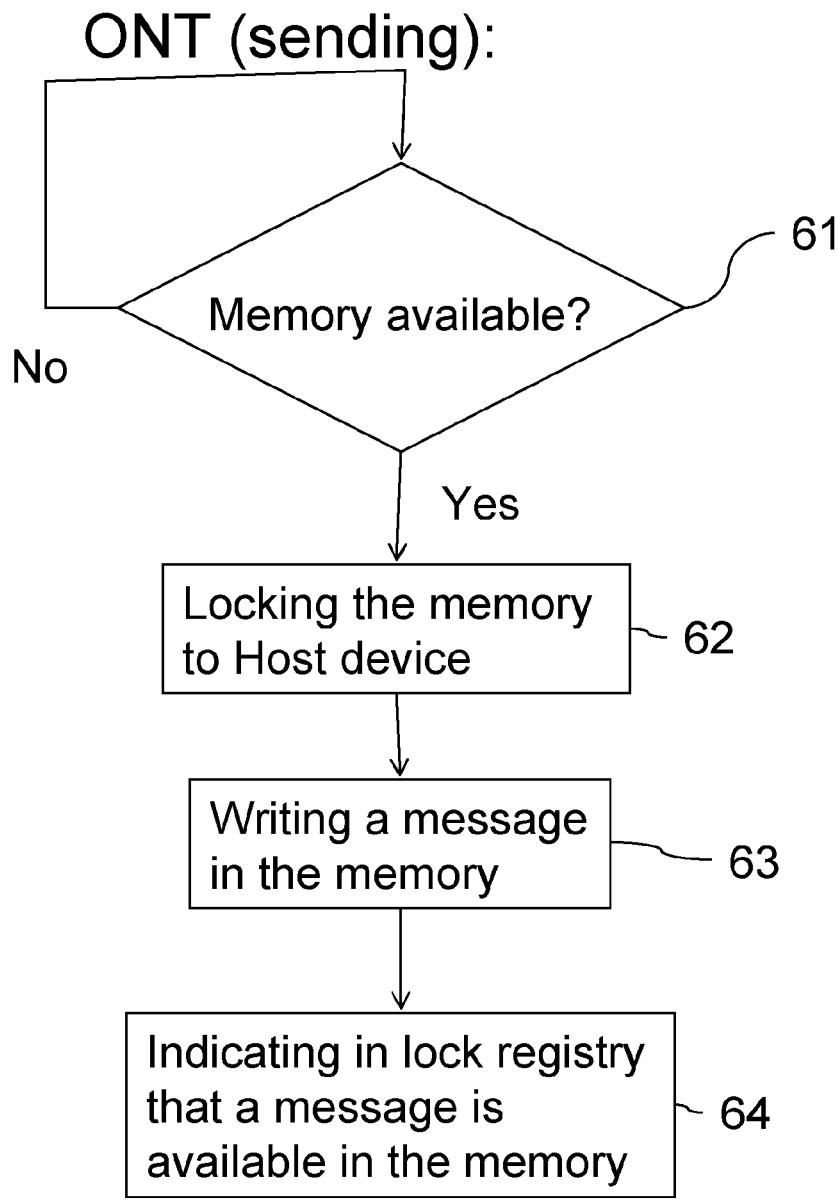
FIG. 6a is an exemplary flow diagram of a method for an ONT of transferring e.g. OMCI configuration parameters to a host device.

FIG. 6a is a flow diagram schematically illustrating an exemplary method for an ONT 1 of communicating with a host device 2 connected to the ONT, using a memory 30 of the ONT that is accessible also to the host device, the memory comprising a lock registry 34. According to the illustrated exemplary embodiment, the communication comprises the ONT sending a message to the host device, the message being associated with an OMCI configuration of a combined ONT-host unit formed by the ONT and the host device. The message could e.g. inform the host device of a changed attribute value of the ONT-host unit.

In step 61, the ONT determines if the memory is available, by reading a lock registry of the memory. When the memory is available to the ONT, the ONT locks the memory to the host device, in step 62, by writing in the lock registry. In step 63, the ONT writes a message in the memory, and the message is associated with the OMCI configuration of the ONT-host unit. Thereafter, the ONT indicates in the lock registry, in step 64, that a message from the ONT is available in the memory.

According to an exemplary embodiment of the method, the ONT is mounted in an SFP, and the ONT is connected to the host device by the SFP being plugged into a suitable contact in the host device. In this embodiment, an interface of the SFP could be used in the communication between the ONT and the host device. Further, the message may comprise at least one of an action identifier, a message identifier, (e.g. a ME identifier), a message content, or a message response, which could be written in appropriate registers of the shared memory.

According to a further embodiment, the method comprises the ONT reading a response from the host device in the memory, after having read in the lock registry that a response from the host device is available. Next, the ONT may unlock the memory by indicating in the lock registry that the memory is not in operation.

Figure 6B:
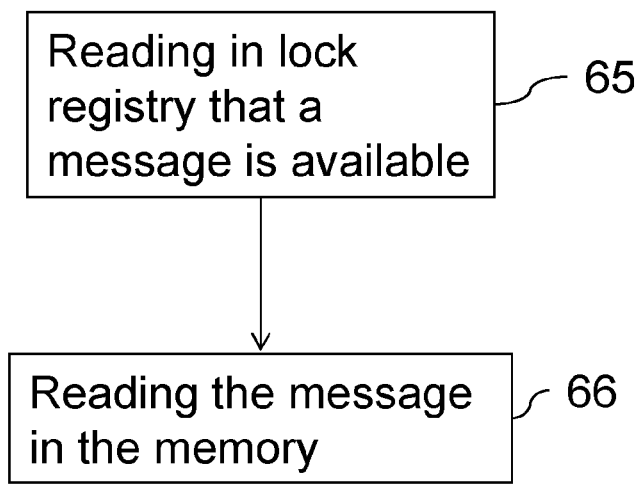
FIG. 6b is an exemplary flow diagram of a method for an ONT of receiving e.g. OMCI configuration parameters from a host device.

FIG. 6b is a flow diagram schematically illustrating another exemplary method for an ONT 1 of communicating with a host device 2 connected to the ONT, using a memory 30 of the ONT that is accessible also to the host device, the memory comprising a lock registry 34. According to this illustrated exemplary embodiment, the communication comprises the ONT receiving a message from the host device, the message being associated with an OMCI configuration of the combined ONT-host unit formed by the ONT and the host device. The message could e.g. instruct the ONT to create a new Managed Entity. In step 65, the ONT reads in the lock registry that a message is available in the shared memory, and in step 66, the ONT reads the message from the host device in the memory.

According to a further embodiment, the ONT performs an internal operation, based on the message received from the host device.

Further, depending on the action or operation indicated in the message, the ONT could write a result of the operation and/or a response in appropriate registers in the memory, and indicate in the lock registry that a result and/or a response is available in the memory.

According to an exemplary embodiment, the ONT unlocks the memory when the communication is over, by writing in the lock registry, e.g. that the memory is not in operation.

Figure 7A:
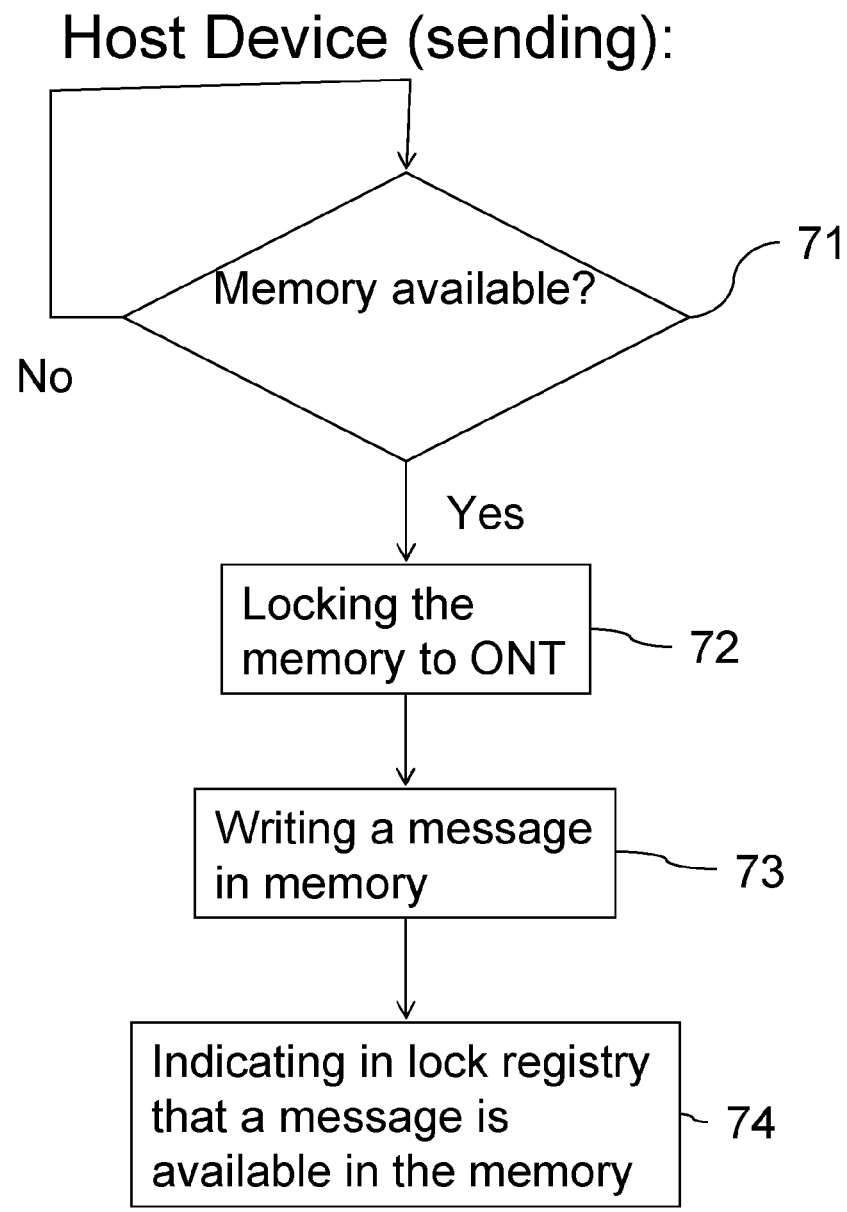
FIG. 7a is an exemplary flow diagram of a method for a host device of transferring e.g. OMCI configuration parameters to an ONT plugged into the host device.

FIG. 7a is a flow diagram schematically illustrating still another exemplary method for an ONT 1 of communicating with a host device 2 connected to the ONT, using a memory 30 of the ONT that is accessible also by the host device, the memory comprising a lock registry 34. According to this illustrated exemplary embodiment, the communication comprises the host device sending a message to the ONT, the message being associated with an OMCI configuration of the combined ONT-host unit formed by the ONT and the host device. The message could e.g. instruct the ONT to create a new Managed Entity.

In step 71, the host device determines if the memory is available, by reading a lock registry of the memory. When the memory is available to the host device, the host device locks the memory to the ONT, in step 72, by writing in the lock registry. In step 73, the host device writes a message in the memory, and the message is associated with the OMCI configuration of the ONT-host unit. Thereafter, the host device indicates in the lock registry, in step 74, that a message from the host device is available to the ONT.

According to an exemplary embodiment of the method, the ONT is mounted in an SFP, and the ONT is connected to the host device by the SFP being plugged into a suitable contact in the host device. In this embodiment, an interface of the SFP could be used in the communication between the ONT and the host device.

Further, the message may comprise at least one of an action identifier, a message identifier, (e.g. a ME identifier), a message content, or a message response, which could be written in appropriate registers of the shared memory.

Figure 7B:
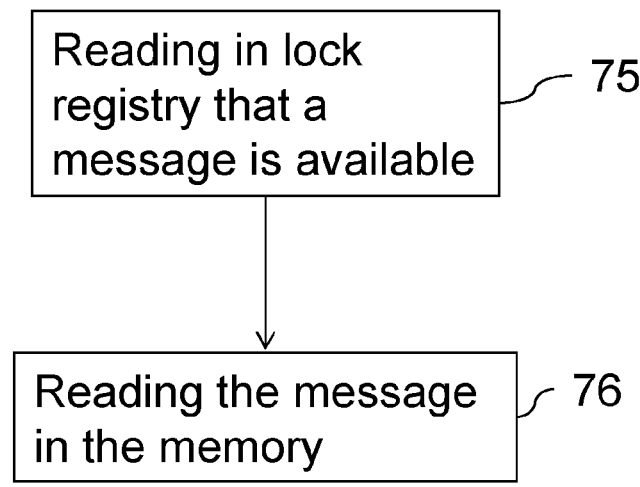
FIG. 7b is an exemplary flow diagram of a method for a host device of receiving e.g. OMCI configuration parameters to an ONT plugged into the host device.

FIG. 7b is a flow diagram schematically illustrating still another exemplary method for an ONT 1 of communicating with a host device 2 connected to the ONT, using a memory 30 of the ONT that is accessible also to the host device, the memory comprising a lock registry 34. According to this illustrated exemplary embodiment, the communication comprises the host device receiving a message from the ONT, the message being associated with an OMCI configuration of the combined ONT-host unit formed by the ONT and the host device. The message could e.g. inform the host device of a changed attribute value of the ONT-host unit.

In step 75, the host device reads in the lock registry that a message is available in the memory, and in step 76, the host device reads the message from the ONT in the memory.

According to a further embodiment, the host device performs an internal operation, based on a message received from the ONT. Further, depending on the action or operation indicated in the message, the host device could write a result of the operation and/or a response in appropriate registers in the memory, and indicate in the lock registry that a result and/or a response is available in the memory.

According to an exemplary embodiment, the host device unlocks the memory when the communication is over, by writing in the lock registry, e.g. that the memory is not in operation.

Figure 8A:
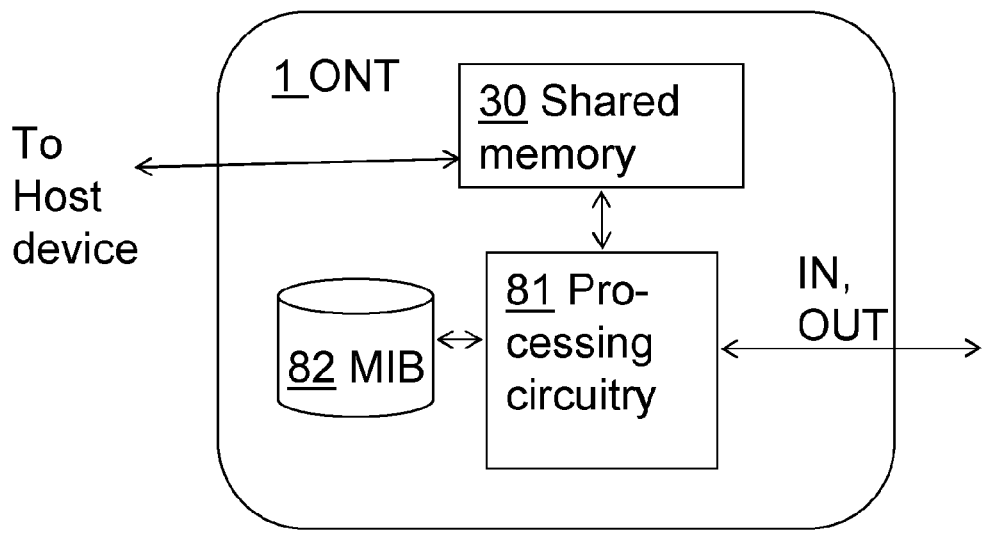
FIGS. 8a and 8b schematically illustrates an exemplary ONT, and its processing circuitry.

FIG. 8a illustrates schematically an ONT (Optical Network Termination) 1 according to an exemplary embodiment, the ONT being connectable to a host device to form a combined ONT-host unit. The ONT comprises a memory 30 that is accessible to a host device that is connected to the ONT, and the memory comprises a lock registry 34 (not illustrated in FIG. 8a). The ONT also comprises a suitable processing circuitry 81. The figure also illustrates an MIB (Management Information Base) 82 for storing OMCI configuration parameters.

According to a first embodiment, the processing circuitry 81 of the ONT is configured to send a message to the host device, wherein the processing circuitry is configured to determine if the memory is available to the ONT by reading the lock registry, and lock the memory to the host device by writing in the lock registry, when the memory is available to the ONT. The processing circuitry is further configured to write a message in the memory, the message being associated with the OMCI configuration of the ONT-host unit, and indicate in the lock registry that the message is available in the memory.

According to another embodiment, the processing circuitry 81 is further configured to read in the lock registry that a response or a result is available in the memory, and to read the response or result in the memory. The processing circuitry 81 of the ONT could be further configured to unlock the memory to the host device by indicating in the lock registry that the memory is not in operation.

According to a second embodiment, the processing circuitry 81 of the ONT is configured to receive a message from the host device, wherein the processing circuitry of the ONT is configured to read in the lock registry of the shared memory that a message is available in the memory, and to read the message from the host device in the memory.

According to a further embodiment, the processing circuitry is configured to perform an internal operation, based on a received message, write a response or a result in the memory, and indicate in the lock registry that a response or result is available.

According to a third embodiment, the processing circuitry 81 of the ONT is configured to be able to both send a message to the host device, and to receive a message from the host device, according to the above-described first and second embodiments.

According to an exemplary embodiment, the ONT is arranged to be connected to the host device by being mounted in an SFP, which is pluggable into a suitable contact in the host device. In this embodiment, an interface of the SFP could be used in the communication between the ONT and the host device.

According to another exemplary embodiment, the memory 30 of the ONT is associated with a digital diagnostic monitoring-function of the ONT.

The ONT further includes suitable receiving and transmitting circuitry, (not illustrated in FIG. 8a), as well as appropriate communication interfaces, including hardware and software capable of performing the necessary modulating, coding, filtering and the like, as well as demodulating and decoding of signals.

Figure 8B:
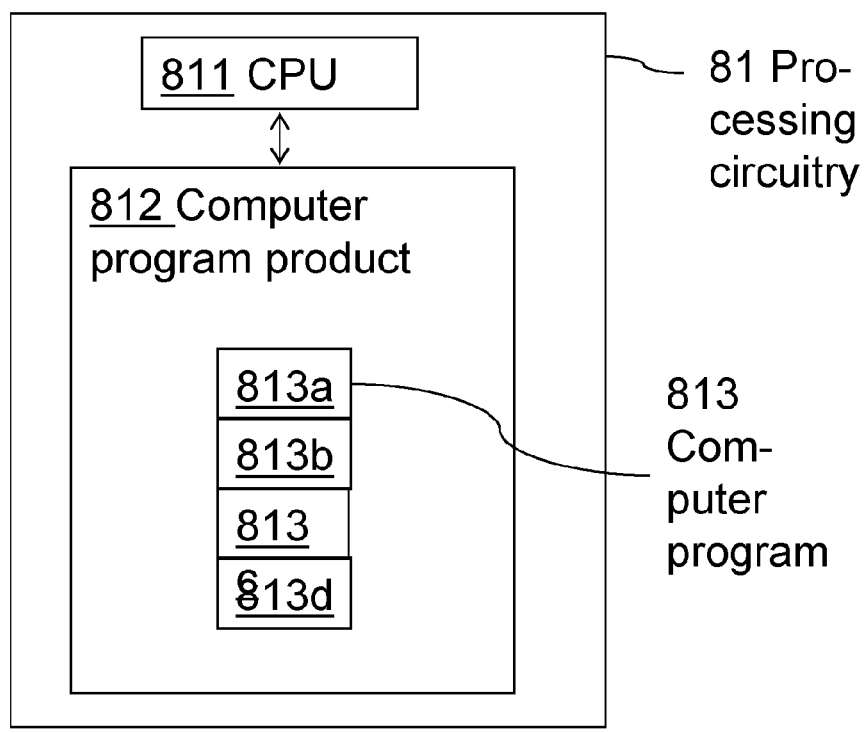

FIG. 8b schematically illustrates the processing circuitry 81, as illustrated in FIG. 8a. The processing circuitry comprises a CPU 811, which may be a single unit or a plurality of units. Furthermore, the processing circuitry comprises at least one computer program product 812, in the form of a non-volatile memory, e.g. an EEPROM (Electrically Erasable Programmable Read-Only Memory), a flash memory or a disk drive. The computer program product 812 comprises a computer program 813 comprising computer program modules 813a,b,c,d which when run on the ONT 1 causes the CPU 811 to perform the steps performed in conjunction with FIG. 6a.

Hence, in the exemplary embodiment illustrated in FIG. 8a, the code means in the computer program 813 comprises a determining module 813a, locking module 813b, a writing module 813c, and an indicating module 813, which may essentially perform the steps of the flow in FIG. 6a for transferring a message to a host device.

According to an alternative embodiment, the computer program 813 is provided with code means for performing the steps of the flow in FIG. 6b, for receiving a message from a host device.

According to a further embodiment, the computer program 813 is provided with code means for performing the steps of the flow of both FIGS. 6a and 6b for enabling a bidirectional communication with the host device.

Figure 9A:
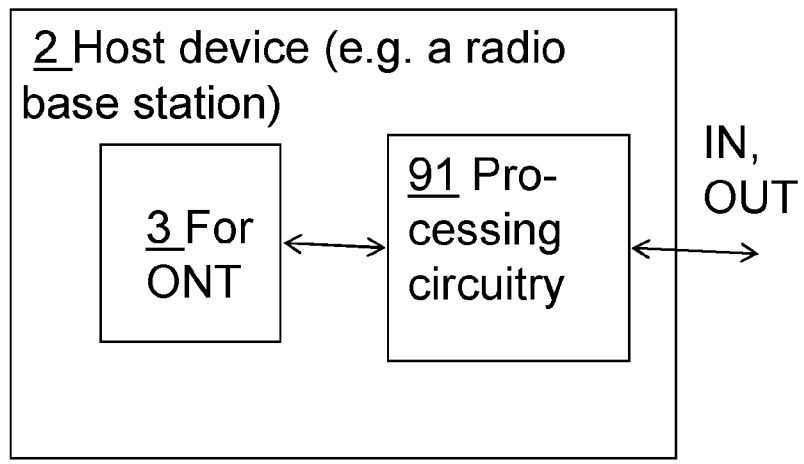
FIGS. 9a and 9b schematically illustrates an exemplary host device, such as e.g. a radio base station, and its processing circuitry.

FIG. 9a illustrates schematically a host device 2, e.g. a radio base station, according to an exemplary embodiment, the host device being connectable to an (Optical Network Termination) 1 to form a combined ONT-host unit. The host device comprises a contact 3 configured to receive e.g. an ONT mounted in an SFP, wherein the ONT, e.g. the SFP, comprises a memory 30 that is accessible also to the host device, and the memory comprises a lock registry 34. The host device comprises a suitable processing circuitry 91 that is configured to communicate with an ONT, using the memory 30 of the ONT.

According to a first embodiment, the processing circuitry 91 is configured to send a message from the host device to the ONT, wherein the processing circuitry is configured to determine if the memory is available to the host device by reading the lock registry, and lock the memory to the ONT by writing in the lock registry, when the memory is available to the host device. The processing circuitry is further configured to write a message in the memory, the message being associated with the OMCI configuration of the ONT-host unit, and indicate in the lock registry that the message is available in the memory.

According to another embodiment, the processing circuitry 91 is further configured to read in the lock registry that a response or a result is available in the memory, and to read the response or result in the memory. The processing circuitry 91 of the host device could be further configured to unlock the memory to the ONT device by indicating in the lock registry that the memory is not in operation.

According to a second embodiment, the processing circuitry 91 of the host device is configured to receive a message from the ONT, wherein the processing circuitry is configured to read in the lock registry of the shared memory that a message is available in the memory, and to read the message from the ONT in the memory.

According to a further embodiment, the processing circuitry is configured to perform an internal operation, based on a received message, write a response or a result in the memory, and indicate in the lock registry that a response or result is available.

According to a third embodiment, the processing circuitry is configured to be able to both send a message to the ONT and to receive a message from the ONT, according to the first and the second embodiments described above.

The host device further comprises suitable receiving and transmitting circuitry (not illustrated in FIG. 9a), as well as appropriate communication interfaces, including hardware and software capable of performing the necessary modulating, coding, filtering and the like, as well as demodulating and decoding of signals.

Figure 9B:
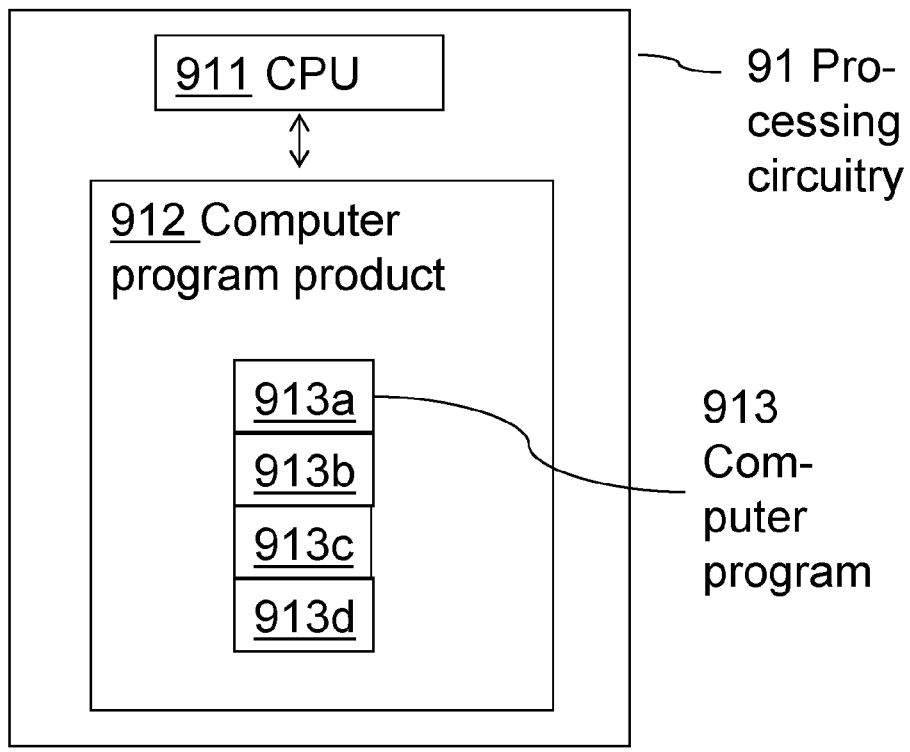

FIG. 9b schematically illustrates the processing circuitry 91, as illustrated in FIG. 9a. The processing circuitry comprises a CPU 911, which may be a single unit or a plurality of units. Furthermore, the processing circuitry comprises at least one computer program product 912, in the form of a non-volatile memory, e.g. an EEPROM (Electrically Erasable Programmable Read-Only Memory), a flash memory or a disk drive. The computer program product 912 comprises a computer program 913 comprising computer program modules 913a,b,c,d which when run on the host device 2 causes the CPU 911 to perform the steps performed in conjunction with FIG. 7a.

Hence, in the exemplary embodiment illustrated in FIG. 9a, the code means in the computer program 913 comprises a determining module 913a, locking module 913b, a writing module 913c, and an indicating module 913, which may essentially perform the steps of the flow in FIG. 7a for transferring a message to an ONT.

According to an alternative embodiment, the computer program 913 is provided with code means for performing the steps of the flow in FIG. 7b, for receiving a message from an ONT. According to a further embodiment, the computer program 913 is provided with code means for performing the steps of the flow of both FIG. 7a and FIG. 7b, for bidirectional communication with an ONT.

Thus, as mentioned above, it is an advantage with exemplary embodiments that they can be implemented only by software, and could use a memory and an interface that is already available, e.g. in an SFP. However, it is also possible to implement one or more of the above-described modules in the computer code partly as hardware circuits.

It may be further noted that the above described embodiments are only given as examples and should not be limiting to the present invention, since other solutions, uses, objectives, and functions are apparent within the scope of the invention as claimed in the accompanying patent claims.

The invention claimed is:

1. A method for an optical network termination, ONT, of transferring a message to a host device, wherein the ONT and the host device are connected to form a combined ONT-host unit, and the message is associated with an ONT Management and Control Interface, OMCI, -configuration of the ONT-host unit, the ONT being provided with a memory that is accessible also to the host device, the memory comprising a lock registry, the method comprising:
 determining, by reading the lock registry, if the memory is available;
 locking the memory to the host device, by writing in the lock registry, when determining that the memory is available;
 writing a message in the memory, the message being associated with an OMCI-configuration of the ONT-host unit; and
 indicating in the lock registry that a message from the ONT is available in the memory.

2. A method according to claim 1, further comprising:
 reading in the lock registry that a response to the message is available in the memory;
 reading the response from the host device; and
 indicating in the lock registry that the memory is not in operation.

3. The method according to claim 1, wherein the message comprises at least one of an action identifier, a message identifier, and a message content.

4. The method according to claim 1, wherein the ONT is mounted in a small form-factor pluggable, SFP, provided with an SFP interface, the method comprising the ONT using said SFP interface for transferring the message to the host device.

5. A method for an optical network termination, ONT, of receiving a message from a host device, wherein the ONT and the host device are connected to form a combined ONT-host unit, and the message is associated with an ONT Management and Control Interface, OMCI, -configuration of the ONT-host unit, the ONT being provided with a memory that is accessible also to the host device, the memory comprising a lock registry, the method comprising:
 reading in the lock registry that a message from the host device is available in the memory; and
 reading the message, the message being associated with an OMCI-configuration of the ONT-host unit.

6. The method according to claim 5, further comprising:
 performing an internal operation, based on the received message;
 writing a result of the operation in the memory, as a response to the received message; and
 indicating in the lock registry that a response is available in the memory.

7. The method according to claim 5, wherein the message comprises at least one of an action identifier, a message identifier, and a message content.

8. The method according to claim 5, wherein the ONT is mounted in a small form-factor pluggable, SFP, provided with an SFP interface, the method comprising the ONT receiving the message from the host device via said SFP interface.

9. A method for a host device of transferring a message to an optical network termination, ONT, wherein the ONT and the host device are connected to form a combined ONT-host unit, and the message is associated with an ONT Management and Control Interface, OMCI, -configuration of the ONT-host unit, a memory of the ONT being accessible also to the host device, the memory comprising a lock registry, the method comprising:
 determining, by reading the lock registry, if the memory is available;
 locking the memory to the ONT by writing in the lock registry, when determining that the memory is available;
 writing a message in the memory, the message being associated with an OMCI-configuration of the ONT-host unit; and
 indicating in the lock registry that a message from the host device is available in the memory.

10. The method according to claim 9, wherein the message comprises at least one of an action identifier, a message identifier and a message content.

11. The method according to claim 9, wherein the ONT is mounted in a small form-factor pluggable, SFP, provided with an SFP interface, the host device transferring the message to the ONT using said SFP interface.

12. A method for a host device of receiving a message from an optical network termination, ONT, wherein the ONT and the host device are connected to form a combined ONT-host unit, and the message is associated with an ONT Management and Control Interface, OMCI, -configuration of the ONT-host unit, a memory of the ONT being accessible to the host device, the memory comprising a lock registry, the method comprising:
- reading in the lock registry that a message from the ONT is available in the memory; and
- reading the message, the message being associated with an OMCI-configuration of the ONT-host unit.

13. The method according to claim 12, further comprising:
performing an internal operation, based on the received message.

14. The method according to claim 13, further comprising:
writing a response in the memory, the response indicating a a result of the operation;
indicating in the lock registry that a response is available in the memory.

15. The method according to claim 13, further comprising:
indicating in the lock registry that the memory is not in operation.

16. The method according to claim 13, wherein the message comprises at least one of an action identifier, a message identifier and a message content.

17. The method according to claim 13, wherein the ONT is mounted in a small form-factor pluggable, SFP, provided with an SFP interface, the host device receiving the message from the ONT via said SFP interface.

18. An optical network termination, ONT, arranged to be connected to a host device to form a combined ONT-host unit, the ONT comprising:
- a memory that is accessible to a host device connected to the ONT, the memory comprising a lock registry; and
- a processing circuitry configured to transfer a message to the host unit, the message being associated with an ONT Management and Control Interface, OMCI, -configuration of the ONT-host unit, by:
  - determining, by reading the lock registry, if the memory is available;
  - locking the memory to the host device by writing in the lock registry, when determining that the memory is available;
  - writing a message in the memory, the message being associated with an OMCI-configuration of the ONT-host unit; and
  - indicating in the lock registry that a message from the ONT is available in the memory.

19. The ONT according to claim 18, wherein the processing circuitry is further configured to transfer the message to the host unit by:
- reading in the lock registry that a response to the message is available in the memory;
- reading the response from the host device in the memory, and
- indicating in the lock registry that the memory is not in operation.

20. The ONT according to claim 18, wherein the message comprises at least one of an action identifier, a message identifier, and a message content.

21. The ONT according to claim 18, wherein the ONT is mounted in an small form factor pluggable, SFP, and is provided with an SFP interface that is used for communicating with the host device.

22. The ONT according claim 18, further comprising an OMCI management information base, MIB, for storing parameters associated with the OMCI-configuration.

23. The ONT according to claim 18, wherein the memory is associated with a digital diagnostic monitoring-function of the ONT.

24. An optical network termination, ONT, arranged to be connected to a host device to form a combined ONT-host unit, the ONT comprising:
- a memory that is accessible to a host device connected to the ONT, the memory comprising lock registry; and
- a processing circuitry configured to receive a message from the host device, the message being associated with an ONT Management and Control Interface, OMCI, -configuration of the ONT-host unit, by:
  - reading in the lock registry that a message from the host device is available to the ONT; and
  - reading the message, the message being associated with an OMCI configuration of the ONT-host unit.

25. The ONT according to claim 24, wherein the processing circuitry is further configured to receive the message from the host device by:
- performing an internal operation, based on the received message;
- writing a response in the memory to the received message, the response indicating a result of the operation; and
- indicating in the lock registry that a response is available in the memory.

26. A host device arranged to be connected to an optical network termination, ONT, to form a combined ONT-host unit, the host device being configured to access a memory of a connected ONT, the memory comprising a lock registry, the host device comprising:
- a processing circuitry configured to transfer a message to a connected ONT, the message being associated with an ONT Management and Control Interface, OMCI, configuration of the ONT-host unit, by:
  - determining, by reading the lock registry, if the memory is available;
  - locking the memory to the ONT by writing in the lock registry, when determining that the memory is available;
  - writing a message in the memory, the message being associated with an OMCI-configuration of the ONT-host unit; and
  - indicating in the lock registry that a message from the host device is available in the memory.

27. The host device according to claim 26, wherein the processing circuitry is further configured to transfer the message to the connected ONT by:
- reading in the lock registry that a response to the message is available in the memory; and
- reading the response from the ONT in the memory.

28. The host device according to claim 26, wherein the message comprises at least one of an action identifier, a message identifier, and a message content.

29. The host device according to claim 26, provided with a contact for receiving an ONT that is mounted in a small form-factor pluggable, SFP, provided with an SFP interface, wherein the host device is arranged to use said SFP interface for communicating with the ONT.

30. A radio base station configured to act as a host device, according to claim 26, for enabling access to a passive optical network, PON.

31. A host device arranged to be connected to an optical network termination, ONT, to form a combined ONT-host unit, the host device being configured to access a memory of a connected ONT, the memory comprising a lock registry, the host device comprising:

a processing circuitry configured to receive a message from a connected ONT, the message being associated with an ONT Management and Control Interface, OMCI, configuration of the ONT-host unit, by:
  reading in the lock registry that a message from the ONT is available in the memory; and
  reading the message, the message being associated with an OMCI-configuration of the ONT-host unit.

32. The host device according to claim 31, wherein the processing circuitry is further configured to receive the message from the connected ONT by:
  performing an internal operation, based on the received message.

33. The host device according to claim 32, wherein the processing circuitry is further configured to receive the message from the connected ONT by:
  writing a response in the memory to the received message, the response indicating a result of the operation; and
  indicating in the lock registry that a response is available in the memory.

34. The host device according to claim 26, wherein the processing circuitry is configured to receive the message from the connected ONT by:
  indicating in the lock registry that the memory is not in operation.

* * * * *